(12) United States Patent
Köhler et al.

(10) Patent No.: US 9,916,870 B2
(45) Date of Patent: Mar. 13, 2018

(54) ASSEMBLY FOR SECURING A SLIDE-IN UNIT, MOUNTING CAGE AND MOUNTING METHOD

(71) Applicant: FUJITSU LIMITED, Kawasaki-shi, Kanagawa (JP)

(72) Inventors: Friedrich Köhler, München (DE); Lorenz Schelshorn, München (DE); Bernhard Gut, München (DE)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/413,933

(22) Filed: Jan. 24, 2017

(65) Prior Publication Data
US 2017/0213579 A1    Jul. 27, 2017

(30) Foreign Application Priority Data
Jan. 26, 2016  (DE) .................. 10 2016 101 335

(51) Int. Cl.
  *G11B 33/02*  (2006.01)
  *G11B 33/12*  (2006.01)
  *G06F 1/18*  (2006.01)
(52) U.S. Cl.
  CPC ............ *G11B 33/124* (2013.01); *G06F 1/187* (2013.01); *G11B 33/027* (2013.01); *G11B 33/128* (2013.01)
(58) Field of Classification Search
  CPC ...... G11B 33/124; G11B 33/128; G06F 1/187
  See application file for complete search history.

(56) References Cited

U.S. PATENT DOCUMENTS

| 6,257,682 | B1 | 7/2001 | Liu et al. | |
| 2003/0133388 | A1* | 7/2003 | Syring | G11B 33/122 720/693 |
| 2003/0184964 | A1 | 10/2003 | Neukam et al. | |
| 2005/0068721 | A1* | 3/2005 | Chen | G06F 1/184 361/679.32 |
| 2005/0155206 | A1 | 7/2005 | Reilley | |
| 2006/0002078 | A1* | 1/2006 | Jing | G11B 33/128 361/679.33 |

(Continued)

FOREIGN PATENT DOCUMENTS

DE    102013109164    2/2015

OTHER PUBLICATIONS

GBSR—Great Britain Combined Search and Examination Report for GB Application No. 1701129.7 dated Jul. 24, 2017.

*Primary Examiner* — Daniel J Rohrhoff
(74) *Attorney, Agent, or Firm* — Fujitsu Patent Center

(57) ABSTRACT

The invention relates to an assembly for securing a slide-in unit in a mounting cage of a computer system. The mounting cage has a first side panel and a second side panel opposite the first side panel. The first side panel has at least one engagement element for engaging into a lateral fastening opening of the slide-in unit. The first side panel and the second side panel are arranged at a distance to one another such that the slide-in unit can be inserted into the mounting cage past the engagement element. After the insertion, a fastening element secured to the second side panel cooperates with the slide-in unit in such a way that the slide-in unit is pushed in the direction of the first side panel and the engagement element engages in the respective lateral fastening opening of the slide-in unit.

10 Claims, 4 Drawing Sheets

(56) References Cited

U.S. PATENT DOCUMENTS

Figure 1:
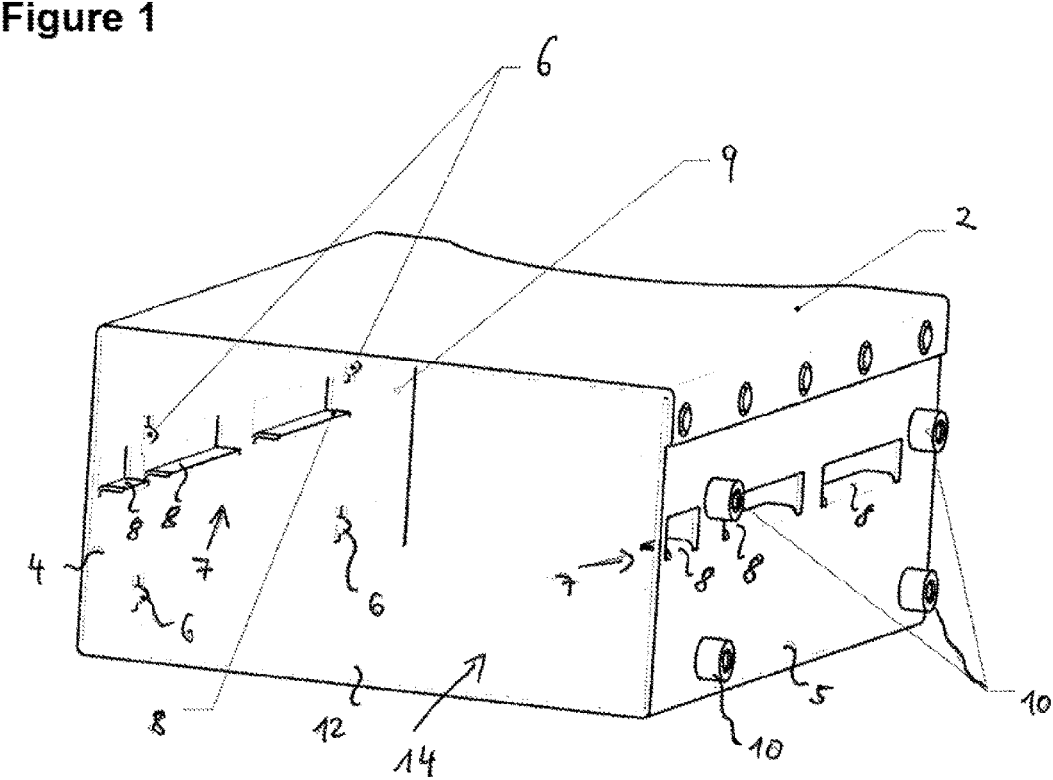

| | | | | |
|---|---|---|---|---|
| 2006/0139868 A1* | 6/2006 | Hood | ............ | G06F 1/181 |
| | | | | 361/679.33 |
| 2014/0139997 A1* | 5/2014 | Liu | ............ | G11B 33/124 |
| | | | | 361/679.37 |
| 2014/0211401 A1* | 7/2014 | Lee | ............ | G06F 1/187 |
| | | | | 361/679.31 |
| 2015/0288098 A1* | 10/2015 | Kuo | ............ | H01R 13/62977 |
| | | | | 439/343 |
| 2015/0382494 A1* | 12/2015 | Hu | ............ | G06F 1/18 |
| | | | | 248/314 |
| 2016/0205802 A1 | 7/2016 | Köhler et al. | | |
| 2017/0045076 A1* | 2/2017 | Niesley | ............ | G11B 33/08 |
| 2017/0125065 A1* | 5/2017 | Chang | ............ | G11B 33/124 |

\* cited by examiner

ASSEMBLY FOR SECURING A SLIDE-IN UNIT, MOUNTING CAGE AND MOUNTING METHOD

The invention relates to an assembly for securing a slide-in unit in a mounting cage of a computer system. Furthermore, the invention relates to a mounting cage for such an assembly as well as to a mounting method for such an assembly.

Assemblies for securing slide-in units of a computer system are known from the prior art. For example, DE 102 13 526 A1 discloses an assembly with holding rails which allow easy and fast installation or deinstallation of drives in a computer housing.

One object underlying the present invention is to provide a concept for an assembly for securing a slide-in unit, which contributes to a simple structure and high mechanical stability.

Disclosed is an assembly for securing a slide-in unit in a mounting cage of a computer system. The mounting cage has a first side panel and a second side panel opposite the first side panel. The first side panel has at least one engagement element for engaging into a lateral fastening opening of the slide-in unit. The first side panel and the second side panel are arranged at a distance to one another and formed such that the slide-in unit can be inserted into the mounting cage past alongside the engagement element. After the insertion, a fastening element secured to the second side panel cooperates with the slide-in unit in such a way that the slide-in unit is pushed in the direction of the first side panel and the engagement element engages into the corresponding lateral fastening opening of the slide-in unit.

For example, the mounting cage is understood to be part of a housing unit of the computer system comprising at least the first and second side panel. Alternatively, the mounting cage is a separate housing unit that can be mounted in the housing of the computer system. Alternatively, the mounting cage per se may be the housing of the computer system or be a part of walls of the housing of the computer system.

The slide-in unit is a storage drive such as a hard disk drive, for example. Alternatively, other drives such as optical drives are conceivable for storage media.

The fastening element can be arranged at the second side panel prior to or after inserting the slide-in unit into the mounting cage. After insertion of the slide-in unit, the (arranged) fastening element is being brought into engagement with the slide-in unit in such a way that this unit per se is mechanically secured to the mounting cage in a reliable fashion via the engagement element of the first side panel and the fastening element. In other words, the slide-in unit is reliably held and fixed in the position thereof via the engagement element and the fastening element. The fastening element is a counter bearing for the engagement element, for example. For example, the engagement element is a screw such as a headless screw or a rivet. The fastening element cooperates with the slide-in unit for securing in a form-fit and/or force-fit manner, for example. For example, the fastening element engages a fastening opening of the slide-in unit correspondingly assigned to the second side panel. By means of the fastening element, optionally the slide-in unit is pushed against the engagement element in such a way that the unit is held at the mounting cage by the virtue of tension, e.g. pressed between the fastening element and the engagement element.

The distance of the first side panel to the second side panel is dimensioned such that the slide-in unit does not collide with the engagement element while being inserted into the mounting cage. In other words, the distance is equal to or greater than a total width of the slide-in unit and the engagement element.

The engagement element is a pin-type element, for example, which protrudes from the first side panel in the direction of the second side panel from the first side panel. The engagement element is formed integrally with the first side panel, for example. For example, the engagement element is formed from the first side panel by means of a deforming method such as embossing. Alternatively, the engagement element is a separate element, which is secured to the first side panel, riveted for example.

The described assembly can be manufactured in a cost-efficient manner and allows a simple and fast mounting process. In particular, the mounting cage can be produced in a cost-efficient manner, for example from a metal sheet, without additional components such as plastics or holding rails. Merely one fastening element for finally securing the slide-in unit in the mounting cage is required as an additional component. Furthermore, the assembly allows a rigid mounting process of the mounting unit with low vibration.

For securing purposes, the slide-in unit is inserted in a predefined or predetermined position in the mounting cage, so that at least the engagement element is arranged flush with the corresponding lateral fastening opening. Optionally, a stop element is provided at the mounting cage, which limits the insertion of the slide-in unit so that the predetermined position is taken. For example, the stop element is part of the first side panel and/or the second side panel or another additional side wall of the mounting cage.

According to one configuration, the first side panel and the second side panel each comprise a guidance, by means of which the slide-in unit can be inserted into the mounting cage. The guidance allows a reliable, guided insertion of the slide-in unit into the mounting cage. For example, the guidances comprise one or multiple guide elements and/or support elements. For example, the guidances are formed as link guides such as rail guides or C-profiles. This allows pushing the slide-in unit into the mounting cage in a form-fit manner.

According to another configuration, the second side panel comprises a thread, in which the fastening element is received. The fastening element is arrangeable at the second side panel of the mounting cage via the thread. Furthermore, the thread allows for the fastening element to be screwable for cooperation with the slide-in unit.

According to another configuration, a threaded sleeve is arranged at the second side panel, which comprises the thread. The threaded sleeve is configured to receive the fastening element. For example, the threaded sleeve is riveted with the side panel. Alternatively, the threaded sleeve is secured to the second side panel in another manner. For example, an opening is formed in the second side panel, to which the threaded sleeve is arranged in a flush manner, so that the fastening element may pass through the opening for cooperation with the slide-in unit.

According to another configuration, the engagement element has a mandrel-type design. In other words, the engagement element is formed as a mandrel or retainer mandrel and comprises a conical tip. This enables a reliable engagement into a corresponding lateral fastening opening of the slide-in unit when securing the fastening element. In particular, the mandrel-type engagement element allows centering the slide-in unit when securing the fastening element to the second side panel. Moreover, production tolerances can be compensated.

According to one configuration, the fastening element engages into a corresponding lateral fastening opening of the slide-in unit. The engagement is effected in a form-fit and/or force-fit manner, for example. For example, it is not necessarily required for the fastening element to be screwed into a thread of the corresponding lateral fastening opening. For example, the fastening element is screwed into the corresponding lateral fastening opening of the slide-in unit for the cooperation or interaction with the latter. By virtue of the engagement into a lateral fastening opening of the slide-in unit, the fastening element mechanically cooperates with slide-in unit in an especially reliable manner for securing this unit.

According to another configuration, the fastening element is a knurled screw. This facilitates a mounting, and, in particular, enables mounting without the use of tools.

Optionally, the knurled screw is additionally provided with a slotted or cross-slotted head. As a result, the knurled screw can be secured both without tools and using tools such as a screwdriver. This allows mounting the assembly in a rapid and efficient manner on the side of the manufacturer in production using corresponding tools, for example, while it is not necessarily required for a customer to have a tool available for the mounting process or dis-mounting process of the slide-in unit.

According to another configuration, the knurled screw is formed in the type of a mandrel at one end assigned to the slide-in unit. In other words, the knurled screw tapers at this end. This results in essentially the above-mentioned advantages with respect to the engagement element.

In another configuration, the first side panel comprises two such engagement elements, and two such fastening elements are provided at the second side panel. As a result, the slide-in unit can be connected at four points to the mounting cage in a fixed and especially reliable manner. This influences the vibration behavior in a particularly positive way in particular when all engagement and fastening elements are formed in the type of a mandrel.

Furthermore, a mounting cage for the above described assembly is disclosed. The mounting cage comprises a first side panel and a second side panel opposite the first die panel. The first side panel has at least one engagement element for engaging into a lateral fastening opening of a slide-in unit. The first side panel and the second side panel are arranged at a distance to one another in such a way that the slide-in unit can be inserted into the mounting cage past the engagement element. Furthermore, the second side panel comprises a means which is configured to receive a fastening element for cooperation with the slide-in unit.

For example, the means is a thread or a threaded sleeve, into which the fastening element can be screwed.

The mounting cage essentially enables the above-mentioned advantages and functions. The mounting cage can be formed or designed in accordance with the above-described configurations.

Furthermore, a mounting method for an above-described assembly is described. The mounting method comprises the steps of:

Providing the mounting cage and the slide-in unit;
Inserting the slide-in unit into the mounting cage past the engagement element;
Securing a fastening element at the second side panel in such a way that this element cooperates with the slide-in unit so that the slide-in unit is pushed in the direction of the first side panel and the engagement element engages in a corresponding lateral fastening opening of the slide-in unit.

The mounting method enables essentially the above-described advantages.

Further advantageous embodiments are disclosed in the following detailed description of an exemplary embodiment.

The exemplary embodiment will be described hereinafter using the attached figures. Like or equivalent elements are provided with like reference numerals through-out the figures.

Figure 2:
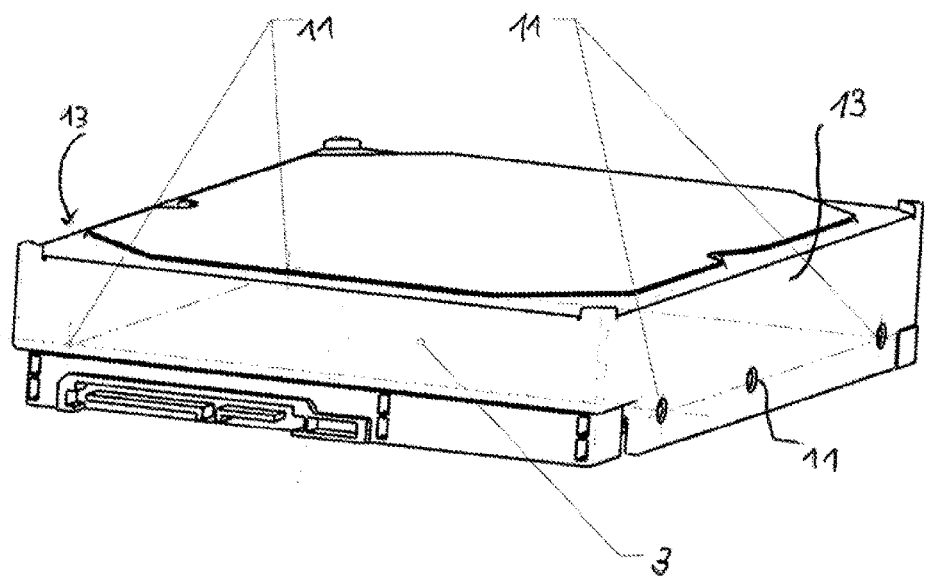
Figure 3:
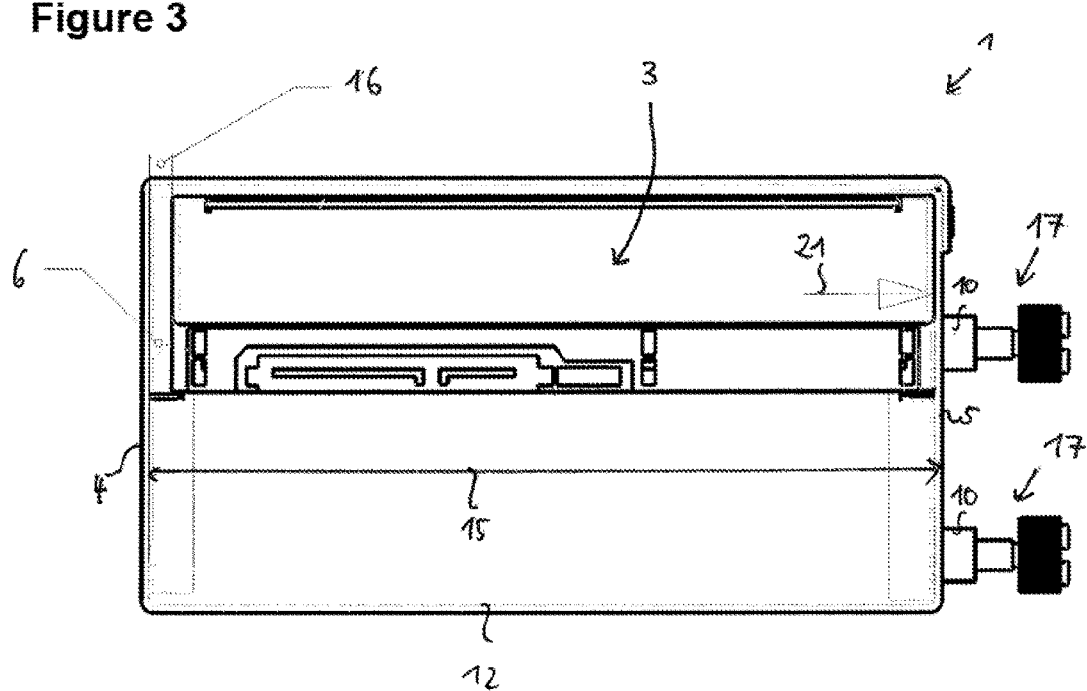
Figure 4:
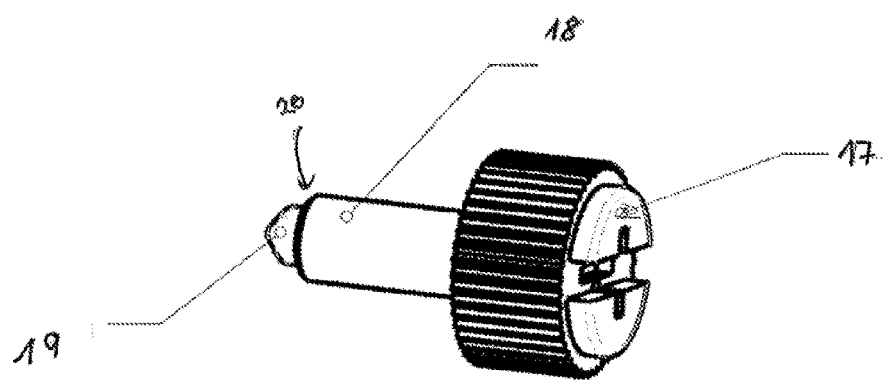
Figure 5:
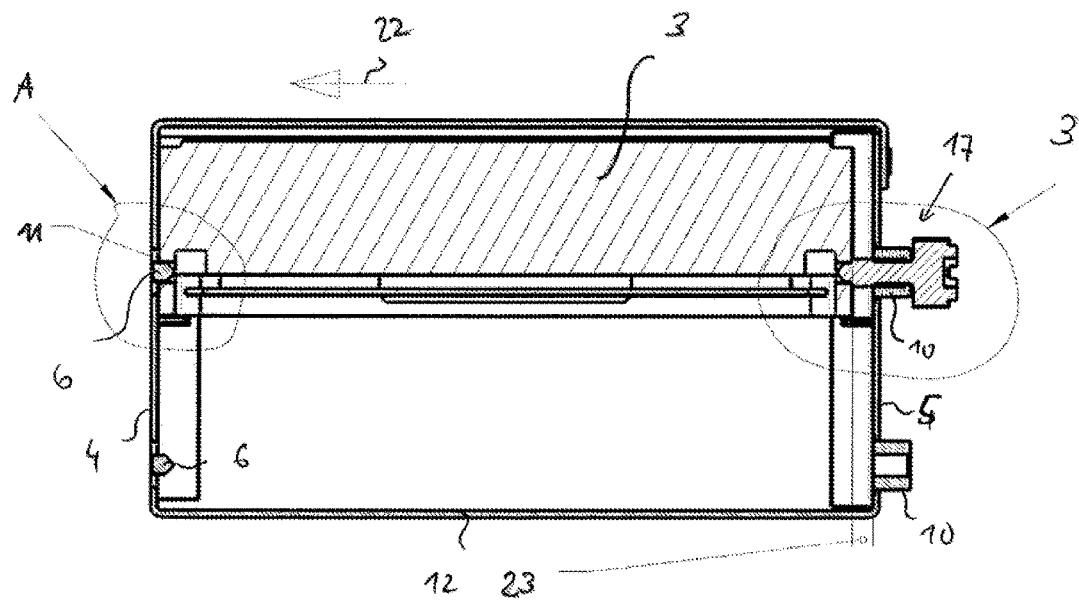
Figure 6:
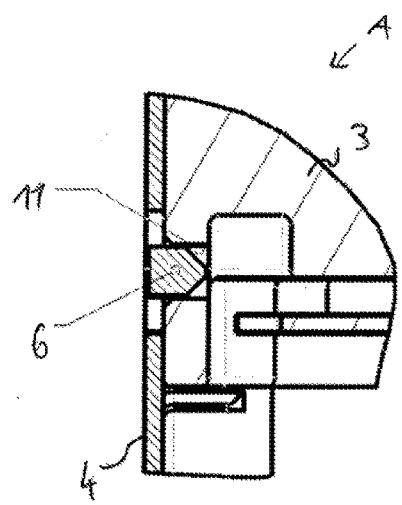
Figure 7:
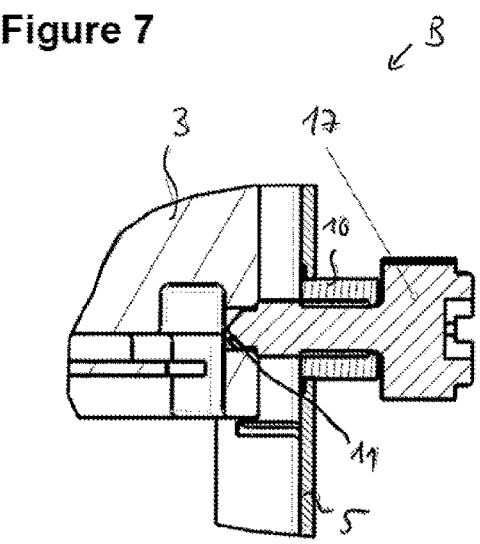
Figure 8:
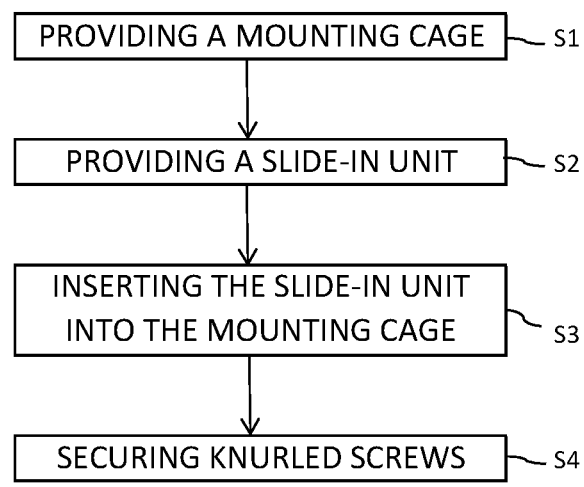

The figures show in:

FIG. 1 a perspective view of a mounting cage,

FIG. 2 a perspective view of a slide-in unit,

FIG. 3 a side view of an assembly with the mounting cage and the slide-in unit after the insertion, FIG. 4 a perspective view of a knurled screw, FIG. 5 the assembly according to FIG. 3 in a completely mounted state, FIGS. 6 and 7 two enlarged detailed views of the assembly according to FIG. 5 in a cross-sectional view, and FIG. 8 a schematic flow diagram of a mounting method of the assembly.

FIG. 1 shows a mounting cage 2 for receiving at least one slide-in unit 3, as exemplified in FIG. 2. The slide-in unit 3 is a storage drive, in particular a hard disk drive. However, other drives or storage media are conceivable as slide-in unit 3.

The mounting cage 2 is made of a metal sheet and comprises a first side panel 4 as well as an opposite second side panel 5. In each case one guidance 7 is provided at the first side panel 4 as well as the second side panel 5, which is in each case formed of multiple lugs 8. The lugs 8 are embossed from the respective side panel 4 or 5, respectively. The guidances 7 may also be designed differently, e.g. as rail guidances, link guidances, C-profiles or the like.

At the first side panel 4, two engagement elements 6 are embossed from the first side panel 4 in the region of the guidance 7. The engagement elements 6 are formed in the type of a mandrel and have a conically tapering tip. The engagement elements 6 may also be referred to as retainer mandrels. The engagement elements 6 are directed in the direction of an interior of the mounting cage 2. In other words, the engagement elements point in the direction of the second side panel 5. Threaded sleeves 10 are secured to an outer side of the second side panel 5, which are substantially arranged to be in each case opposite one engagement element 6.

The mounting cage 2 comprises two stop elements 9, which are in each case integral with a side panel 4 or 5, respectively. In FIG. 1, the stop element 9 arranged at the second side panel 5 is covered and thus not illustrated. The stop elements 9 are made in the form of bent wall lugs. Alternatively or additionally, other stop elements, e.g. separate elements such as protrusions, pins or bolts, or molded or deformed stop elements such as embossed elements are conceivable.

Except for the threaded sleeves 10, all of the described elements of the mounting cage 2 are formed in one piece in deforming methods such as embossing, bending or punching.

It is pointed out that even a housing base 12 of the mounting cage 2 can serve as a guidance in place of the guidances 7 (see FIG. 1 the engagement elements 6 and threaded sleeves 10 assigned to the housing base 12).

The mounting cage 2 is formed to receive the slide-in unit 3 according to FIG. 2 so that the unit can be secured to the mounting cage 2 in a reliable manner. The slide-in unit 3 comprises lateral fastening openings 11 at opposite sides 13, respectively. Each of the two sides 13 is assigned to one of the two side panels 4 and 5, respectively, of the mounting cage 2.

The mounting process of the slide-in unit 3 in the mounting cage 2 will hereinafter be described using the flow diagram of a mounting method schematically illustrated in FIG. 8.

In a first step S1 and a second step S2, the mounting cage 2 shown in FIG. 1 or the slide-in unit 3 shown in FIG. 2 are provided. The steps S1 and S2 can also be performed the other way around.

In a further step S3, the slide-in unit 3 is inserted into the mounting cage 2 using the guidances 7. The insertion is effected in an insertion direction 14 (see FIG. 14). The slide-in unit 3 is inserted all the way until bearing against the stop elements 9.

This mounting state is shown in FIG. 3, which shows an assembly 1 with a mounting cage 2 and the slide-in unit 3 in a side view (normal to the insertion direction 14). A distance 15 between the two side panels 4 and 5 is dimensioned such that the slide-in unit 3 can be inserted into the mounting cage 2 past the engagement elements 6. In other words, a distance 16 between the first side panel 4 and the side 13 of the slide-in unit 3 facing the first side panel 4 is greater than a point of the engagement elements 6 located the farthest away from the first side panel 4. Preferably, the slide-in unit 3 is inserted into the mounting cage 2 while butting against the second side panel 5 of said cage (see arrow 21). This ensures that the slide-in unit 3 will not collide with the engagement elements 6 and be damaged in the worst case.

Furthermore, knurled screws 17 are illustrated in FIG. 3, which are at least partially screwed into the corresponding threaded sleeves 10 and are thus arranged at the second side panel 5. The knurled screws 17 are fastening elements.

FIG. 4 shows such a knurled screw in a perspective view by way of example. The knurled screw comprises a thread 18 as well as a mandrel 19 at a free end. At an end opposite the mandrel 19, the knurled screw 17 is provided with a cross-slot for receiving a tool, in particular a screwdriver.

After the insertion, according to the step S3, the knurled screws 17 are secured or seized in a step S4 in such a way that they engage with the mandrel 19 into the corresponding lateral fastening openings 11 of the slide-in unit 3, and push and press this unit in the direction of the first side panel 4 (see arrow 22). This is shown in FIG. 5, which shows the assembly 1 in a secured state of the slide-in unit 3 in a cross-section (normal to the insertion direction 14). As a result, the engagement elements 6 engage into the corresponding lateral fastening openings 11 of the slide-in unit. In other words, the knurled screws 17 are screwed in such a way that the slide-in unit 3 is secured to the mounting cage 2 via the engagement elements 6 and the knurled screws 17 in a secure and fixed manner. When securing or screwing the knurled screws 17, these screws pass through corresponding openings assigned to the threaded sleeves 10 in the second side panel 5 at least with the free end of the mandrels 19, in order to finally engage into the lateral fastening openings. The distance 16, illustrated in FIG. 3, between the first side panel 4 and the slide-in unit 3 is essentially no longer present or reduced, while a distance 23 between the second side panel 5 and the assigned side 13 of the slide-in unit 3 is formed.

As illustrated in FIG. 4, a shoulder 20, for example in the form of a step, is provided between the mandrel 19 and the thread 18. Thus, each knurled screw 17 contacts the slide-in unit 3 while being screwed-in in the peripheral region of the respective lateral fastening opening 11. As a result, slide-in unit 3 can be secured in a particularly secure manner, particularly achieving a favorable force transmission for pushing the slide-in unit 3 in the direction of the first side panel 4.

FIGS. 6 and 7 show detailed views A and B of FIG. 5 in a cross-sectional view. FIG. 6 illustrates how an engagement element 6 engages into the corresponding lateral fastening opening 11 of the slide-in unit. In analogy to this, FIG. 7 shows how the mandrel 19 of the knurled screw 17 is arranged in the corresponding lateral fastening opening 11 of the slide-in unit. The slide-in unit 3 is securely held via the mandrel-type design of the engagement elements 6 and the knurled screws 17. The mandrel-type designs ensure a secure insertion of the engagement elements 6 or of the knurled screws 17 into the respective lateral fastening openings 11 of the slide-in unit 3. The respective engagement is effected in a form-fit manner. A screw-type engagement into a possibly present internal thread of each lateral fastening opening 11 does not take place.

The described assembly 1 can be mounted and dismounted without tools. The assembly 1 can be produced and mounted in a simple, fast and cost-efficient manner. Furthermore, a rigid, low-vibration fastening of the slide-in unit 3 can be achieved by seizing the knurled screws 17.

In not-illustrated exemplary embodiments, only one knurled screw 17 is used instead of two knurled screws 17. This screw is screwed into the fastening opening 11 of the slide-in unit 3, which is provided in the center at a side 13, for example (see FIG. 2).

In further not illustrated exemplary embodiments, another type of screw is used in place of the knurled screws 17, e.g. headless screws with or without knurling.

LIST OF REFERENCE NUMERALS 1 assembly
2 mounting cage
3 slide-in unit
4 first side panel
5 second side panel
6 engagement element
7 guidance
8 lug
9 stop element
10 threaded sleeve
11 lateral fastening opening
12 housing base
13 side
14 insertion direction
15 distance
16 distance
17 knurled screw
18 thread
19 mandrel
20 shoulder
21 arrow
22 arrow
23 distance
A detailed view
B detailed view
S1 to S4 steps

The invention claimed is:
1. Assembly for securing a slide-in unit in a mounting cage of a computer system, wherein
the mounting cage has a first side panel and a second side panel opposite the first side panel;

the first side panel has an engagement element for engaging into a lateral fastening opening of the slide-in unit;

the first side panel and the second side panel are arranged at a distance to one another, the distance being equal to or greater than a total width of the slide-in unit and the engagement element, such that the slide-in unit can be inserted into the mounting cage past alongside the engagement element; and after the insertion, a fastening element secured to the second side panel cooperates with the slide-in unit in such a way that the slide-in unit is pushed in the direction of the first side panel and the engagement element engages in the respective lateral fastening opening of the slide-in unit.

2. Assembly according to claim 1, wherein the first side panel and the second side panel each have a guide, by means of which the slide-in unit can be inserted into the mounting cage.

3. Assembly according to claim 1, wherein the second side panel has a thread, with the fastening element being received therein.

4. Assembly according to claim 3, wherein a threaded sleeve is arranged on the second side panel, which comprises the thread.

5. Assembly according to claim 1, wherein the engagement element has a mandrel-type design.

6. Assembly according to claim 1, wherein the fastening element engages into a corresponding lateral fastening opening of the slide-in unit.

7. Assembly according to claim 1, wherein the fastening element is a knurled screw.

8. Assembly according to claim 7, wherein the knurled screw has a mandrel-type design on an end assigned to the slide-in unit.

9. Mounting cage for the assembly according to claim 1, comprising the first side panel and the second side panel opposite the first side panel; wherein the first side panel has the engagement element for engaging into the lateral fastening opening of the slide-in unit;

the first side panel and the second side panel are arranged at the distance to one another such that the slide-in unit can be inserted into the mounting cage past the engagement element; and the second side panel has a means that is adapted to receive the fastening element for cooperation with the slide-in unit.

10. Mounting method for the assembly according to claim 1, comprising the steps:

providing the mounting cage and the slide-in unit;

inserting the slide-in unit past the engagement element into the mounting cage; and securing the fastening element to the second side panel such that said element cooperates with the slide-in unit, so that the slide-in unit is pushed in the direction of the first side panel and the engagement element engages into a corresponding lateral fastening opening of the slide-in unit.

* * * * *